April 6, 1948. A. G. RICHARDSON ET AL 2,438,946
RADIO DIRECTION FINDING SYSTEM
Filed Feb. 20, 1943 3 Sheets-Sheet 2
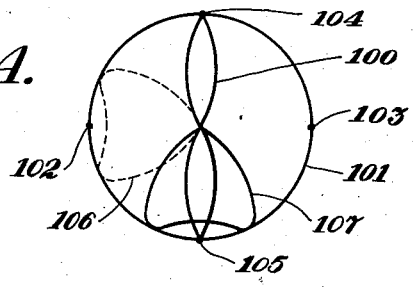
Fig: 1A.
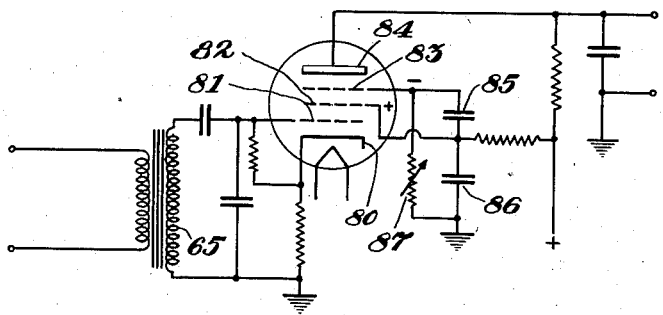
Fig: 2
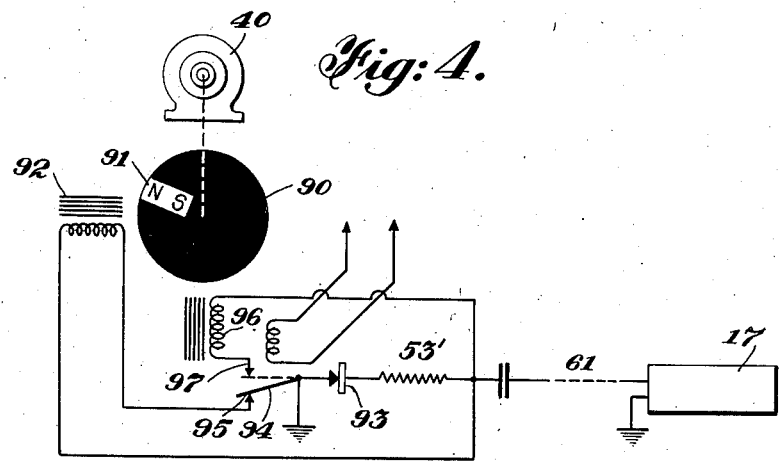
Fig: 4.
INVENTORS
AVERY G. RICHARDSON
FRANK O. CHESUS
FRANK G. THOMAS
BY
ATTORNEY

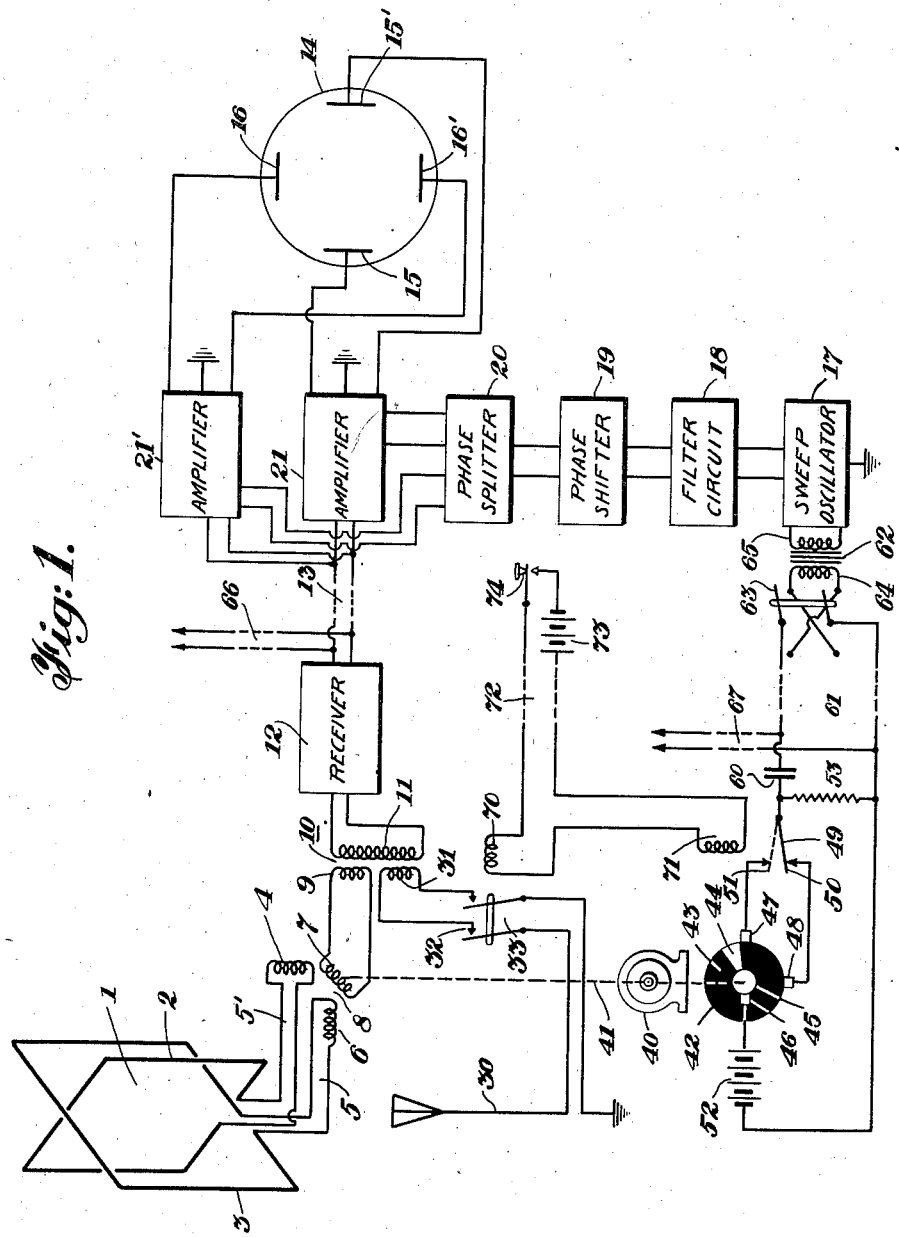

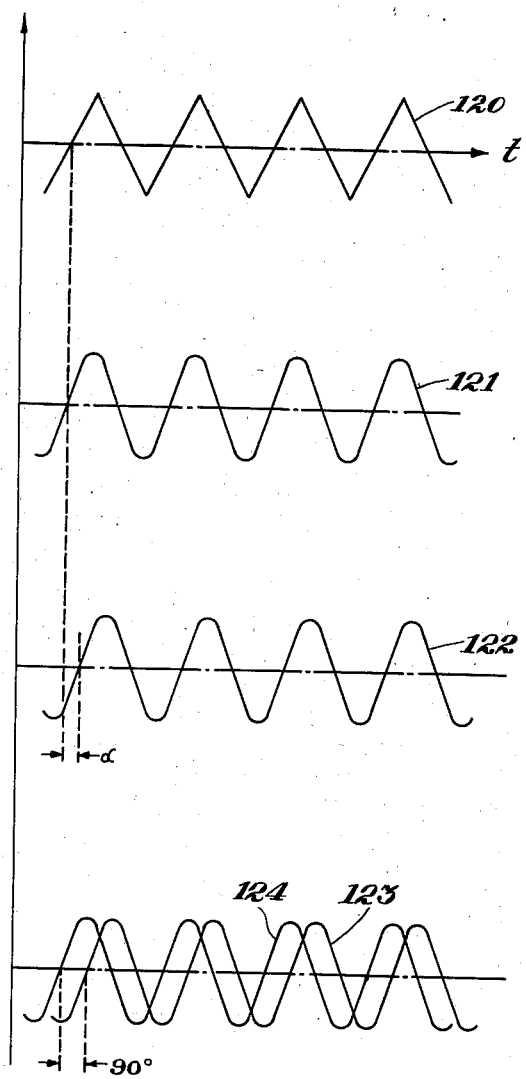

Patented Apr. 6, 1948

2,438,946

UNITED STATES PATENT OFFICE 2,438,946

RADIO DIRECTION FINDING SYSTEM

Avery G. Richardson, Boonton, N. J., and Frank O. Chesus and Frank G. Thomas, Islip, N. Y., assignors to Federal Telephone and Radio Corporation, Newark, N. J., a corporation of Delaware Application February 20, 1943, Serial No. 476,596

5 Claims. (Cl. 250—11)

1

This invention relates to radio direction finding, and in particular to the type of direction finder wherein a visual trace appearing on the screen of a cathode ray oscillograph indicates either the direction line or the bearing of the received energy. More specifically, our invention provides means for maintaining synchronism between the sweep circuit voltage of the oscillograph and the angular position of a rotating member associated with the directional antenna system.

It is, therefore, an object of our invention to devise a radio direction finding system wherein an oscillograph will indicate either the direction line or the bearing of received wave energy.

Another object of our invention is to devise a means for controlling the sweep voltages of a cathode ray oscillograph.

Another object of our invention is to devise a means for synchronizing the sweep voltages of an oscillograph with a modulated voltage derived from received wave energy.

Another object of our invention is to devise a simple and reliable means for shifting the sweep voltage of an oscillograph 90° with respect to the envelope of a modulated voltage derived from received wave energy, whereby the true bearing, rather than the direction line will be indicated by the trace on the oscillograph screen.

And it is a further purpose of our invention to devise a means whereby any or all of the above objects may be attained, even though the oscillograph and its associated apparatus are located at a distance from the directional receiving antenna.

Other objects and principles of our invention will become apparent as we proceed with the specification and an explanation of the accompanying drawings of which:

Fig. 1 represents a schematic circuit diagram illustrating a preferred embodiment of our invention;

Figure 1A is a diagram showing various traces which may appear on the fluorescent screen of a cathode ray oscillograph in accordance with our invention;

Figure 2 shows a negative resistance electronic oscillator used as a sweep circuit oscillator which may be used with our invention;

Figure 3 is a set of curves representing the wave shape of the sweep circuit oscillations as the latter pass through the various circuits of the equipment; and Figure 4 is an alternative arrangement for producing the same results as do certain portions of the circuit of Figure 1.

2

Our invention will be described as it may be applied to a radio direction finding system, in which it is necessary to maintain the rotor coil of a goniometer and the initiation of the sweep circuit trace appearing on the fluorescent screen of a remote cathode ray indicator in a predetermined relative position, in order that a true indication of the direction line or the bearing of the received energy will at all time be obtained.

Referring now to Figure 1, the numeral 1 represents a directional receiving antenna of the crossed loop type. This type of antenna is shown by way of example only, since other types, such as the well known Adcock antenna, could be substituted therefor. From the directional loop 2 the received energy is transmitted over transmission line 5' to a goniometer stator coil 4. Similarly, the energy from loop 3, which is at right angles to loop 2, is transmitted over transmission line 5 to the goniometer stator coil 6. The transmission lines 5 and 5' may be designed, for example, in accordance with the disclosure of a copending application of H. G. Busignies, Serial No. 468,668, filed December 11, 1942, now Patent No. 2,246,175, granted August 26, 1947, and assigned to the same assignee, although other suitable lines may, of course, be used.

The voltages from two loop antennas as they arrive at the stator coils 4 and 6 have a 90° phase relation. Since the stator coils 4 and 6 are spaced at right angles to each other, a rotary magnetic field is produced, which varies in intensity in accordance with the direction of the received energy. Within this rotating field is placed a rotating coil 7, which has induced therein during its rotation a voltage which varies with the angular position of the received energy, and with its angular position in the rotating field. The coil 7 is driven by means such as a motor 40. This voltage is impressed on the primary winding 9 of a transformer 10. The output from the secondary 11 of this transformer may be amplified and demodulated in a receiver 12, shown in block form. The output from the receiver is transmitted over the transmission line 13 to an indicator and its associated circuits which may be located at a remote point. The type of indicator 14, which we prefer to use in connection with our invention is one employing a cathode ray tube having horizontal and vertical deflecting plates.

Figure 1 shows this indicator and circuits in block diagram form. Numerals 15 and 15' represent the horizontal deflection plates and the numerals 16 and 16' represent the vertical deflection plates of the indicator. When the voltages on the horizontal and the vertical deflection plates are equal in magnitude and have a 90° phase relation, the electron beam of the oscillograph produces a circular trace or sweep on the fluorescent screen of the indicator, as is well known in the art. These quadrature related voltages originate in a sweep oscillator 17.

The sweep oscillator is of the type containing a vacuum tube which operates on a principle which makes use of the fact that a negative transconductance exists between the control grid and the anode grid thereof. It will be more completely described later in connection with the description of Fig. 2. The oscillator produces a wave of triangular shape at a frequency substantially the same as the frequency of rotation of the goniometer rotor coil 7. It is highly desirable that the original voltage have a high harmonic content in order that the frequency may be easily synchronized with a controlling voltage. The fundamental should also be sufficiently stable to prevent any shift in its frequency when a synchronizing voltage is applied.

Two triangular shaped waves in quadrature phase relation, if applied to the horizontal and vertical deflection plates of the oscillograph, would not produce a circular sweep on the fluorescent screen. It thus becomes necessary to substantially filter out all harmonic frequencies leaving just the fundamental sine wave. This is accomplished by passing the triangular shaped wave through a smoothing or filter circuit, shown in Fig. 1 as the block 18.

The output, which now has the form of a substantially pure sine wave is passed through a phase shifter without change of wave form. The function of the wave shifter 19 will be described hereinafter. Next, the sine wave is passed through a phase splitter 20, whose function it is to develop from the single sine wave, two sine waves having a quadrature phase relation. Phase splitters are well known in the art, and it is therefore unnecessary to describe this circuit in detail. The two quadrature related voltages are then passed on to two sweep voltage amplifiers 21—21', one for each phase and shown as blocks, where they are amplified to a value suitable for producing the circular sweep on the cathode ray oscillograph screen.

The output of the transmission line 13 is also applied to the sweep voltage amplifiers 21—21', and controls both of these amplifiers in the same phase. This output is the demodulated output from the transformer 10 after it has been amplified and detected in the receiver 12. It contains an envelope frequency corresponding to that of the rotational frequency of the rotor coil 7, which in one preferred example of the invention was 30 cycles, per second, since the rotor driving means 40 was 1800 R. P. M. motor.

When no energy is being received, a circular trace or sweep appears on the fluorescent screen of the indicator. When energy is being received, the trace recedes toward the center of the screen. This is true because the receiver circuits are so designed that an increased input thereto results in a decreased output therefrom. This decrease in receiver output is of course a function of the direction of the received energy, and also of the instantaneous angular position of the rotor coil, and it is obvious that this change in receiver output should be synchronized with the sweep circuit voltage in order that true and fixed indications on the screen will result.

When the direction line of the received energy is being determined, the trace on the fluorescent screen may take a form substantially as shown by the full line 100 in Fig. 1A, this figure representing various traces which may be observed under different conditions. In the absence of received energy, the circular or sweep trace 101 is observed. When the received energy is a maximum for a given instantaneous position of the rotor coil 7, the receiver output is a minimum and the circular trace recedes a maximum amount, say from the points 102 and 103. When the received energy is a minimum (and bearings are usually obtained on minimum readings), the receiver output is a maximum and the circular trace recedes a minimum amount, say from the points 104 and 105. If the received energy is zero, the circular trace and the trace 100 will coincide at the points 104 and 105. In this case, the line 104—105 represents the direction line of the received energy and may be read from a suitable scale, not shown, surrounding the circular trace.

In accordance with known practice, when the bearing or sense, rather than the direction line of the received energy, is to be observed, a voltage from a sensing antenna 30 is applied to the receiver 12 through the transformer 10. This is accomplished by the closure of the relay contacts 32, as will be explained later. Under these conditions, the trace representing the bearing may appear on the fluorescent screen in the form shown approximately by the dotted line 106 of Fig. 1A. The line of symmetry 102—103 of this dotted trace is positioned at an angle of 90° with respect to the direction line. This is undesirable, since a mental interpretation must be made in order to obtain the true bearing. By retarding or advancing the initiation of the sweep voltage by 90°, this interpretation is performed automatically. When this is done, the trace 106 is displaced 90°, and assumes a position shown for example by the full line 107. The lines of symmetry for the traces 100 and 107 now coincide and point toward the same scale reading.

The main feature of our invention will now be described. As above indicated, it is necessary that the instantaneous angular position of the rotor coil 7, and the instantaneous angular position of the electron beam of the indicator with respect to a given reference line be maintained in a fixed and predetermined phase relation. This is accomplished as follows: The motor 40 drives the rotor coil 7 through a shaft indicated by the dotted line 41, and also drives a pulsing device 42, shown in Figure 1, as a rotary contactor. The contactor consists of a disc 43 of insulating material, having a conducting segment 44. This conducting segment is connected with a slip ring 45 on which bears a brush 46. Two other brushes 47 and 48 bear on the periphery of the disc, and are spaced 90 electrical degrees apart. The purpose of the contactor is to produce an electric pulse each revolution of the rotor coil 7. This pulse is produced by momentarily connecting a battery 52 in circuit with an impedance 53 through a single pole, double throw switch 49. When the arm of the switch makes contact with the contact 50, brush 48 is in the pulsing circuit, and when the arm is in the position shown by the dotted line 51, the brush 47 is in the pulsing circuit.

It will be seen that during one revolution of the rotor coil 7, a pulse may be produced in either of two positions of the contactor segment 44. These are 90 electrical degrees apart, depending on the position of the switch 49. Regardless of which brush 47 or 48 is making contact with the segment 44, a voltage is impressed across the impedance 53, and this voltage passes through the blocking condenser 60 to a line 61. At the far end of the line is located a transformer 62, the primary 64 of which is connected to the line 61 through a double pole, double throw switch 63. The two positions of this switch permit the voltage impressed on the coil 64 to have either one of two phases 180° apart, and facilitates obtaining the desired phasing of the sweep voltages. The secondary voltage of the transformer 62 is impressed on the input of the sweep circuit oscillator, and serves to synchronize this oscillator with the impressed voltage.

As the impulses pass from the impedance 53 to the sweep circuit over the line 61, they suffer a certain phase displacement depending on the length of the line, and it is necessary that this phase displacement be corrected in order that the trace on the indicator will give a true indication of either the direction line or the bearing of the incoming energy. The phase shifter 19 above mentioned, together with the reversing switch 63, produces this correct phasing of the voltage which operates the sweep circuit.

When it is desired to determine the sense or true bearing of the received energy rather than just the direction line thereof, the sensing antenna 30 is connected to the primary coil 31. This is accomplished by energizing the relay coil 70 and the relay coil 71 of the relays 33 and 49. This may be accomplished in any suitable manner, such as by completing the circuit 72, consisting of the coils 70 and 71, a battery 73, and the switch 74. The switch 74 and battery 73 may, if desired, be located at a remote point, together with the other apparatus associated with the indicator. Otherwise, they may be located at the receiver. The phase of the sensing voltage impressed on the stator coil 31 is determined in any suitable manner, for example, in accordance with the teachings of the above-mentioned application to H. G. Busignies, Serial No. 468,-668. When this voltage is combined with the voltage from the directional antenna 1, the trace on the screen of the oscillograph assumes a position at 90° with respect to the desired position, as above described. In order to correct for this, the alternate brush 47 is connected with the impulsing circuit. When this brush is connected in circuit, the impulse generated by the contactor 42 is either retarded or advanced as the case may be, 90 electrical degrees. This impulse passing through the line 61 to the sweep circuit oscillator causes the sweep circuit voltage to also shift 90°, and results in switching the trace on the indicator 14 to a position showing the true bearing of a received energy.

Referring now to Figure 2, we have shown a type of sweep circuit oscillator, which is well adapted for circuits of this type. The general type of oscillator we employ has now become known in the art as a transitron oscillator and operates on the principle that a negative transconductance exists betweeen the control grid and the anode grid thereof. The oscillator shown in Figure 2 is of the pentode type. The sequence of tube elements between the cathode 80 and the anode 84 is the synchronizing grid 81, the anode grid 82, and the control grid 83. The synchronizing grid 81 forms no part of the oscillator proper, but is merely employed to synchronize the oscillations produced with a synchronizing voltage impressed on this grid. The frequency of the oscillations are determined by the capacitors 85 and 86 and the resistor 87. The resistor is preferably made variable in order that the frequency of the oscillations may be adjusted. The principle on which the oscillator operates is not important, in so far as our invention is concerned. As above briefly stated, however, it is desirable to have an oscillator of this type, since it produces a triangular shaped wave, which is rich in harmonics. As previously suggested, a wave of this type is highly desirable, since it is more readily synchronized with an incoming pulse. On the other hand, a wave shape of this type is not satisfactory for producing a true circular trace on the screen of the indicator. It is, therefore, necessary that this triangular shaped wave be smoothed out through a network designed to pass merely the fundamental. Any type of wave filter which will produce this result will be satisfactory for the purpose of our invention, so the network 18 hereinabove referred to, will not be described in detail.

In Fig. 3, we have shown a group of curves illustrating the wave form of the generated triangular wave as it passes from circuit to circuit from the oscillator to the sweep voltage amplifier. Curve 120 is the approximate form of the wave as it is generated in the modified transitron oscillator. After passing through the filter or smoothing circuit represented by the block 18, it has the form of a substantially pure sine wave, the harmonics having been suppressed. This is represented by the curve 121 of Fig. 3. The sine wave passes through the phase shifter 19, without change of form as shown by the curve 122. A certain phase shift $\alpha$ is produced, the amount of the shift depending on several factors, such as the phase shift of the pulse over line 61 with respect to the shift which the received energy undergoes in passing over line 13, the position of the segment 44 of the rotary contactor 42 with respect to the position of rotor 7, etc.

The phase splitter 20 produces two sine waves 123 and 124 from the wave 122. Circuit adjustments within the phase splitter are such that the waves 123 and 124 have a 90° phase relation. If there should be any phase rotation within the phase splitter, and there usually is, it may be compensated for by the phase shifter 19. Any of the known types of phase splitting circuits which will produce two 90° phase related voltages may be employed so that the particular circuit represented by the block 20 is not described in detail.

In addition to the lines 13 and 61 for transmitting the received energy and the synchronizing voltage from the receiver to the remote indicator, respectively, we have also illustrated in Fig. 1 two additional lines 66 and 67 which may lead to another remote indicator and its associated circuits, the operation of which may be the same as that described in connection with the indicator 14. Not only two, but a plurality of lines for remote indicators may be connected to the receiver and pulsing circuits. It is obvious that a local indicator could also be employed and usually this local indicator is desirable. In this case, the switch 74 would be normally located at the local indicator and the necessary switching for obtaining a trace showing either the direction line or the true bearing of the received energy would be done locally.

Means other than that illustrated in Fig. 1 may be used for producing the desired pulsing voltage. Figure 4, for example, shows an alternate arrangement for producing the pulsing voltage described in connection with the operation of the contactor 42 above. In Figure 4, the motor 40 drives a disc 90 having a magnet 91 located on its periphery. As the magnet 91 passes by the coil 92 once each revolution, the voltage induced in this coil is impressed on the impedance 53' through the rectifying device 93, the relay armature 94 being in engagement with contact 95. With the relay armature 94 in the position shown by the dotted line and in engagement with contact 97, the coil 96 is placed in circuit with the rectifier 93 and the impedance 53'. This coil 96 has a 90° phase relation with the coil 92, and therefore when the magnet 91 passes the coil 96, a voltage is induced in this coil which has a 90° phase relation with the voltage induced in the coil 92. The voltage induced across impedance 53' is passed onto the line 61 and to the indicator 17 in exactly the same manner as shown in Figure 1 and from this point on the operation of the sweep circuit oscillator, smoothing networks, phase shifters, etc., is exactly the same as in the circuits of Figure 1.

A direction finding system in accordance with our invention readily lends itself to a variety of types of installation. For example, it may be very desirable to locate the directive antenna system and the receiver at a site where the terrain is quite flat, of good conductivity, and free from obstacles, such as trees, etc., while locating the indicator proper at a remote point, perhaps many miles away. This type of installation is particularly advantageous during wartime, since delicate indicating apparatus and the operator therefore may be located at a point of comparative safety. Furthermore, if one wishes to operate on several frequencies, and these frequencies require the installation of separate antennas, the various antennas may be placed at separated locations, and all of the indicating equipment used in conjunction therewith may be located at a single distant point.

Furthermore, if one wishes to triangulate on unknown transmitters, the location of directional receiving antennas at widely different points facilitates this triangulation problem. The outputs of all antennas can be brought to a single point where the operator may determine from the bearings of the received signals from the various antennas just where the unknown transmitter is located.

While we have described above the principles of our invention in connection with specific apparatus, and particular modifications thereof, it is to be clearly understood that this description is made only by way of example and not as a limitation on the scope of our invention as set forth in the objects of our invention and the accompanying claims.

What is claimed is:

1. In a radio direction finding system having a directional receiving antenna and a translator having a continuously rotating means for deriving from the received energy a voltage which varies with the angular position of said rotating means and with the direction of said received energy, the combination of means for producing sweep voltages, an oscillograph controlled by said sweep voltages and said derived voltage, a sweep oscillator, having an output voltage for controlling said sweep voltages producing means, a pulsing circuit for producing pulses at a predetermined angular position of said rotating means, and means for applying said pulses to said oscillator for synchronizing said output voltage with said derived voltage, whereby said oscillograph indicates the direction line of said received energy.

2. In a radio direction finding system having a directional receiving antenna, a sensing antenna, a translator having a continuously rotating means for deriving from the received energy a voltage which varies with the angular position of said rotating means and with the direction of said received energy, combining means for combining said derived voltage with the voltage from said sensing antenna, and means for selectively coupling and uncoupling said sensing antenna to and from said combining means, the combination of means for producing sweep voltages, an oscillograph controlled by said sweep voltages and said derived voltage, a sweep oscillator having output voltages for controlling said sweep voltage producing means, a first pulsing circuit for producing pulses at a predetermined angular position of said rotating means, a second pulsing circuit, said second circuit producing other pulses having a 90° time phase relation with the pulses produced by said first circuit, and switching means for selectively operating said coupling and uncoupling means and for selectively applying said first named pulses and said other pulses to said sweep oscillator, whereby, either the direction line or the bearing of said received energy may be indicated on said oscillograph.

3. In a radio direction finding system, the combination in accordance with claim 1, wherein said pulsing circuit comprises a current source, a rotating member, means for rotating said member, a pair of contacts operated by said member, and an impedance, the operation of said contacts producing a change of current flowing through said impedance.

4. In a radio direction finding system, the combination of a local station, a remote station and transmission means having an electrical phase displacement between said local and remote stations, said local station comprising a directional antenna for receiving wave energy, a translator including a continuously rotating means for deriving from said antenna a voltage which varies with the angular position of said rotating means and with the direction of the received energy, and a pulsing circuit for producing pulses at a predetermined position of said rotating means; said remote station comprising means for producing sweep voltages, an oscillograph controlled by said sweep voltages and said derived voltage, and a sweep oscillator having an output voltage for controlling said sweep voltages producing means; means for applying said derived voltage to said oscillograph over said transmission means, means for applying said impulses over said transmission means for synchronizing said output voltage with said derived voltage, and phase shifting means for correcting for said phase displacement, whereby said oscillograph indicates the direction line of said received energy.

5. In a radio direction finding system having a directive antenna, a goniometer provided with a continuously rotating coil for receiving energy from said antenna, and a sensing antenna, the combination of a remote visual indicator, means for producing a circular sweep on said indicator, means for rotating said coil, and a pulsing device operated by said last named means, said device having means for transmitting electrical pulses to said circular sweep producing means, whereby synchronism is maintained between the rotation of said coil and said sweep producing means to produce a trace representing the bearing of said received energy.

AVERY G. RICHARDSON.
    FRANK O. CHESUS.
    FRANK G. THOMAS.

REFERENCES CITED

The following references are of record in the file of this patent:

UNITED STATES PATENTS

| Number | Name | Date |
|---|---|---|
| 440,415 | Ganiayre et al. | June 8, 1943 |
| 2,263,377 | Busignies et al. | Nov. 18, 1941 |
| 2,268,085 | Roberts | Dec. 30, 1941 |
| 2,271,550 | Hermanspann et al. | Feb. 3, 1942 |